US010800867B2

(12) United States Patent
Simal et al.

(10) Patent No.: US 10,800,867 B2
(45) Date of Patent: Oct. 13, 2020

(54) PROCESS TO PRODUCE POLYVINYL-ESTER COMPOSITIONS WITH LOW RESIDUAL MONOMER AND THE USE THEREOF

(71) Applicant: HEXION INC., Columbus, OH (US)

(72) Inventors: François Simal, Ottignies-Louvain-la-Neuve (BE); Nathalie Haveaux, Ottignies-Louvain-la-Neuve (BE); Aurélien Laurant, Ottignies-Louvain-la-Neuve (BE)

(73) Assignee: HEXION INC., Columbus, OH (US)

( * ) Notice: Subject to any disclaimer, the term of this patent is extended or adjusted under 35 U.S.C. 154(b) by 0 days.

(21) Appl. No.: 14/648,885

(22) PCT Filed: Dec. 3, 2013

(86) PCT No.: PCT/EP2013/003643
§ 371 (c)(1),
(2) Date: Jun. 1, 2015

(87) PCT Pub. No.: WO2014/086477
PCT Pub. Date: Jun. 12, 2014

(65) Prior Publication Data
US 2015/0344606 A1    Dec. 3, 2015

(30) Foreign Application Priority Data
Dec. 5, 2012   (EP) .................................... 12008131

(51) Int. Cl.
| *C08F 220/68* | (2006.01) |
| *C08F 218/10* | (2006.01) |
| *C08F 220/18* | (2006.01) |
| *C08F 220/06* | (2006.01) |
| *C08F 220/14* | (2006.01) |
| *C08F 6/00* | (2006.01) |
| *C08F 2/00* | (2006.01) |

(52) U.S. Cl.
CPC ............ *C08F 220/68* (2013.01); *C08F 2/001* (2013.01); *C08F 6/003* (2013.01); *C08F 6/006* (2013.01); *C08F 218/10* (2013.01)

(58) Field of Classification Search
CPC ........ C08F 220/68; C08F 2/001; C08F 6/003; C08F 6/006; C08F 218/10; C08F 220/14; C08F 220/18

USPC ............................................................ 524/801
See application file for complete search history.

(56) References Cited

U.S. PATENT DOCUMENTS

| 4,252,931 A | 2/1981 | Marquadt et al. | |
| 4,322,516 A * | 3/1982 | Wiest .................... | C08F 218/08 428/355 AC |
| 4,831,077 A * | 5/1989 | Ball ....................... | C09J 131/04 524/819 |
| 4,847,341 A | 7/1989 | Ball et al. | |
| 4,908,268 A * | 3/1990 | Mudge ................... | C08F 218/04 428/343 |
| 5,521,266 A | 5/1996 | Lau | |
| 5,525,656 A | 6/1996 | Heiling et al. | |
| 5,686,518 A | 11/1997 | Fontenot et al. | |
| 6,160,049 A | 12/2000 | Mathauer et al. | |
| 6,576,698 B1 * | 6/2003 | Weitzel ................. | C08F 220/12 524/458 |
| 2007/0088120 A1 | 4/2007 | Zecha et al. | |
| 2014/0072817 A1 | 3/2014 | Vanacke et al. | |

FOREIGN PATENT DOCUMENTS

| EP | 0017986 A1 | 10/1980 |
| EP | 0185356 A2 | 6/1986 |
| EP | 0332860 A2 | 9/1989 |
| EP | 0573037 | 12/1993 |
| EP | 1110978 A1 | 6/2001 |
| EP | 1318181 | 6/2003 |
| EP | 1777241 | 4/2007 |
| EP | 2524950 A1 | 11/2012 |
| WO | WO2006/044401 | 4/2006 |

OTHER PUBLICATIONS

Zhang Fengru, "Modification on Acrylic Pressure-Sensitive Cement", Journal of Jiaying University (Natural Science), No. 1, pp. 53-58 (Dec. 31, 1996), China. (Partial Trans.).

* cited by examiner

*Primary Examiner* — Kelechi C Egwim

(57) ABSTRACT

A process for reducing the amount of residual monomer in aqueous polymerization emulsion by using a sequential polymerization steps, The first step consists in adding an emulsion, of vinyl ester of alkyl of C1 to C18 carboxylic acids, to water containing a radical initiator, the second step consists in adding further an emulsion of alkyl acrylate and/or methacrylate, and the third step consists in c) adding to polymeric emulsion, resulting of the steps a) and b), pure liquid acrylate or methacrylate with alkyl chain of $C_1$ to $C_{12}$.

7 Claims, No Drawings

PROCESS TO PRODUCE POLYVINYL-ESTER COMPOSITIONS WITH LOW RESIDUAL MONOMER AND THE USE THEREOF

RELATED APPLICATION DATA

This application claims the benefit of PCT Application PCT/EP2013/003643 with an International Filing Date of Dec. 3, 2013, published as WO 2014/086477 A1, which further claims priority to European Patent Application No. EP 12008131.0 filed Dec. 5, 2012, the entire contents which are hereby incorporated by reference.

The present invention is on processes for reducing residual monomers in final polymeric emulsion containing copolymerized amounts of at least one vinyl ester and a multifunctional monomer and providing improved adhesive properties.

Inherently tacky pressure sensitive adhesive (PSA) acrylic polymers formed by emulsion polymerization are well known in the art as replacements for solution adhesive polymers.

The water borne pressure-sensitive adhesives utilize acrylic monomers to provide low glass transition temperatures (Tg) to the inherently tacky copolymer, unsaturated carboxylic acid monomers to enhance adhesion to polar surfaces and multifunctional monomers to improve cohesive strength with minimal loss of loop tack and other properties.

Recently (EP2524950) it has been taught that compositions based on vinyl ester of alkyl with 2 to 17 carbon atoms lead to excellent adhesive properties and particularly providing adhesion and tack while maintaining cohesion at a high level.

However, the copolymerization of such hydrophobic monomers by emulsion polymerization route results in high residual content of those vinyl esters. It is ecologically desirable to reduce residual monomer content in the emulsion and still to provide enhanced adhesive properties. This is the subject of the present invention.

Several techniques have been proposed to avoid high level of residual monomer in the final emulsion. Attempts to make homopolymers of very hydrophobic monomers, such as those of vinyl branched esters, have failed because of very low conversions even if the polymerization is conducted for a long time, e.g. in excess of 48 hours.

Many attempts to polymerize said monomers resort to costly techniques such as: use of organic solvents or other monomers to act as solvents for the hydrophobic monomer; use of macromolecular organic compounds having a hydrophobic cavity; and use of high levels of surfactants.

For example, U.S. Pat. No. 5,521,266 describes an aqueous polymerization method for forming polymers including the step of complexing at least one monomer having low water solubility with a macromolecular organic compounds with a hydrophobic cavity used such as cyclodextrins and cyclodextrin derivatives.

The aforementioned methods use polar monomers to impart functionality to the latex particles. These polar monomers are usually carboxylic acids and hydroxy- and amide-containing monomers. It is well known to those skilled in the art that acid monomers are used in emulsion polymerization for various reasons, one being to improve latex stability. However, the presence of polymerized acid in the polymer is undesirable for coating applications and moisture sensitive applications, such as corrosion control, as it increases the affinity of the polymer for water, i.e., decreases the hydrophobicity of the polymer.

U.S. Pat. No. 5,686,518 discloses a polymerization process, referred to as miniemulsion polymerization, for polymerizing monomers and monomer mixtures which are said to be essentially insoluble in water, i.e., which have water solubility ranging from 0 to about 5 weight percent.

U.S. Pat. No. 6,160,049 discloses an emulsion polymerization process that combines macroemulsion and miniemulsion feed streams for preparing an aqueous polymer dispersion from free-radically polymerizable compounds. The process requires feeding in separate streams a monomer with a solubility of at least 0.001 wt % and a monomer with a solubility of less than 0.001 wt %, and requires emulsification of both monomer streams. The emulsification of the monomer streams is done using high pressure homogenizers at pressures of up to 1200 bar. However, this peripheral equipment is not commonly found in conventional emulsion polymerization practice.

Another example, WO2006/044401, is the use of specific surfactants, which are characterized by a critical micelle concentration of less than 0.005 WT %.

All those techniques are not providing a method leading to a total residual monomer level below 600 ppm.

In view of the disadvantages of known processes, an improvement to polymerize hydrophobic monomers by a radical initiation in an aqueous medium is requested by the industry. After an extensive research on the process conditions to be applied for the emulsion polymerization, we found that by adding an alkyl acrylate or methacrylate at the end of the polymerization reaction we could reduce the residual monomer level below the 500 ppm. We found also that by adjusting the addition time of the pre-emulsions and the "cooking" period the residual monomer level was reduced.

The ability to offer PSA showing an excellent Health Safety and Environmental (HSE) profile (Low Volatile Organic Content (VOC) and odor) is becoming critical for more and more PSA binder producers. In this respect, lattices with low residual monomers play an important role to meet such requirements. As free monomers present in the final latex may contribute to VOC level and odor, those need to be reduced to very low levels. Although, from the regulatory standpoint, in contrast to paints and coatings, there is no industry standard that specifies a particular residual monomer level for PSA.

The systems have been designed in such a way that 20% of VeoVa-10 are combined with a blend of acrylic monomers to achieve a low Tg material (−40° C.).

Whereas a judicious choice of process conditions has led us to the development of robust systems, analysis of residual monomers by means of Gas Chromatography has revealed low amounts of unreacted VeoVa-10 (~350 ppm) by use of the optimized booster system. This invention describes the approach we have followed to reach the target of <500 ppm of residual VeoVa-10 or other alkyl (C1 to C18) vinyl esters specially design for low Tg PSA applications.

The process of the present invention is set as follows: by using 3 sequential polymerization steps:

first step consists in a) adding an emulsion, of vinyl ester of alkyl of C1 to C18 carboxylic acids, to water containing a radical initiator, second step consists in b) adding to a) an emulsion of alkyl acrylate and/or methacrylate, third step consists in c) adding to polymeric emulsion, resulting of the steps a) and b), pure liquid acrylate or methacrylate with alkyl chain of $C_1$ to $C_{12}$.

An alternative process is set as follows: by using 3 sequential steps:

first step consists in
- a) adding an emulsion, of vinyl ester of alkyl of C1 to C18 carboxylic acids, to water containing a radical initiator, second step consists in
- b) maintain the reaction for 30 to 60 minutes at the same temperature, third step consists in
- c) adding to a) an emulsion of alkyl acrylate and/or methacrylate.

The vinyl ester of alkyl of C1 to C18 carboxylic acids in the first step consists in a linear alkyl chain or from 3 carbon atoms is a branched alkyl chain or from 5 carbon atoms consists in branched tertiary alkyl chain or a mixture thereof. Examples are: vinyl propionate, vinyl n-butyrate, vinyl laurate, vinyl ester of 2-ethyl hexanoic acid (VEHA), vinyl caprate (n-decanoate), and vinyl stearate (n-octadecanoate), vinyl esters of the so called versatic acids or vinyl neodecanoates (VeoVa 9, VeoVa 10), vinyl pivalate.

The acrylate monomers used are including the acrylate and the methacrylate esters are reaction products of ethylenically unsaturated carboxylic acids and C1 to C20 alcohols. Examples of the acrylate monomers used in the second step are including the acrylate and the methacrylate ester are: methyl (meth)acrylate, ethyl (meth)acrylate, propyl (meth)acrylate, n-butyl (meth)acrylate, isobutyl (meth)acrylate, t-butyl (meth)acrylate, pentyl (meth)acrylate, hexyl (meth)acrylate, cyclohexyl (meth)acrylate, benzyl (meth) acrylate, 2-ethylhexyl (meth)acrylate, heptyl (meth)acrylate, n-octyl (meth)acrylate, iso-octyl (meth)acrylate, nonyl (meth)acrylate, decyl (meth)acrylate, 2-propyl heptyl (meth) acrylate, undecyl (meth)acrylate, dodecyl (meth)acrylate, tridecyl (meth)acrylate, lauryl (meth)acrylate, stearyl (meth) acrylate, isobornyl (meth)acrylate, norbornyl (meth)acrylate, 4-tertbutylcyclohexyl (meth)acrylate, 3,3,5-trimethylcyclohexyl (meth)acrylate or a mixture thereof.

The liquid acrylate or methacrylate used could be with alkyl chain of 1 to 16 carbon atoms or preferably from 1 to 12 carbon atoms or more preferably from 1 to 8 carbon atoms.

Examples are:

methyl (meth)acrylate, ethyl (meth)acrylate, propyl (meth)acrylate, n-butyl (meth)acrylate, isobutyl (meth)acrylate, t-butyl (meth)acrylate, pentyl (meth)acrylate, hexyl (meth)acrylate, cyclohexyl (meth)acrylate, benzyl (meth) acrylate, 2-ethylhexyl (meth)acrylate, heptyl (meth)acrylate, n-octyl (meth)acrylate, iso-octyl (meth)acrylate or a mixture thereof.

Methods

Gas Chromatography Analysis

A Gas Chromatography-FID method is used for the evaluation of the residual monomer. Approximately 50 ml of THF is added to a closed flask. Additionally, 2.5 g of latex is injected in the flask, and the mixture shaken until complete dissolution occurs. The samples are filtered with a 0.45 mm filter, and 1 ml is injected in the GC. The concentration is calculated with the help of an external standard. First a high standard is analyzed to see what concentration level is present. Then a standard with a lower concentration is analyzed and the sample is calculated. When the samples are calculated with the two standards the difference is less than 5%. The result calculated with the lowest concentration is reported.

| Column | |
|---|---|
| Type | Wax 52 |
| Length | 25 m |
| Diameter | 0.32 mm |
| Film Thickness | 1.2 □m |
| GC settings | |
| Auxiliary He flow to FID | 30 ml/min |
| Carrier gas | He |
| Flow | 2 ml/min |
| Split ratio | 1/12.5 |
| Sensitivity range | 0 |
| Attenuation | 0 |
| Equilibrium time | 0 min |
| Air flow rate | 300 ml/min |
| Hydrogen flow rate | 30 ml/min |
| Temperature | |
| Maximum oven temperature | 300° C. |
| Initial temperature | 35° C. |
| Initial time | 15 min |
| Time length | 74.17 min |
| Final temperature | 250° C. |
| Rate | 6° C./min |
| Injection port temperature | 250° C. |
| FID temperature | 250° C. |
| Injection volume | |
| Sample size | 1 □l |

Test methods:

Adhesion-180° Peel test according to the FINAT TEST METHOD No. 1 (FTM-1) was done on samples after 24 h storage at 25° C., RH:50%; the substrate is stainless steel (SS), glass or high densitypolyethylene (PE).

Loop-Tack test according to the FTM-9 method was done on a sample of 1×1×25 mm on SS after 24 h storage at 25° C.

Cohesion-static shear test according to FTM-8 method was done on a sample of 1×0.5 25 mm-1 kg on SS after 24 h storage at 25° C.

EXAMPLES

Latex Preparation See Table 1 for the Intake of Composition of Example 2

The reactor is charged with water and potassium persulfate and heated to 85° C. A 10% seed from the pre-emulsion 1 (PE 1) (containing all of the VeoVa-10) is added and reacted for 10 minutes before the remainder of the PE 1 is fed for 1 h. At the end of the addition, the PE 2 containing the acrylic monomers is added for 2 hours. At the end of this addition, a shot of pure monomer (acrylate or a vinyl ester) is added and reacted for 0.5 h whereas the initiator solution is fed in parallel for a total of 3.5 h. After a 1 h cooking period, the latex is cooled down to 60° C. The agitation is slowed down to about 100 rpm, to avoid to any "funnel" into the latex. A 10% solution of sodium carbonate and sodium hydrogenocarbonate (1/1) is added to adjust the pH to ±4. A first addition of Bruggolite®FF6 M solution is added in one shot. After 5 minutes, the remainder of the Bruggolite®FF6 M and the tBHP are added via two separate lines during 90 minutes.

Finally, the reactor is cooled down to room temperature and a biocide is added. The product is finally filtered over a 130μ filter. The final latex has a solid content of ~53%.

A way to determine the residual level of VeoVa-10 and other residual monomers, is to perform a Gas Chromatography (GC) analysis. The GC method and sampling procedure is described in above section. The level of residual monomer was followed with time. A small amount (+−10 g) of latex is taken out from the reactor each 30 minutes, mixed with 10 mg of hydroquinone and immediately place in the ice. The samples are then analyzed by GC.

Latex Preparation of Composition of Example 3

The reactor is charged with water and potassium persulfate and heated to 85° C. A 10% seed from the pre-emulsion 1 (PE 1) (containing all of the VeoVa-10) is added and reacted for 10 minutes before the remainder of the PE 1 is fed for 1 h 30 minutes. At the end of the addition, the reaction mixture is kept at 85° C. for 30 minutes after that period the PE 2 containing the acrylic monomers is added for 2 hours 30 minutes. At the end of this addition, the reaction medium was kept at 85° C. for 30 minutes, then the latex is cooled down to 60° C. The agitation is slowed down to about 100 rpm, to avoid any "funnel" into the latex. A 10% solution of sodium carbonate and sodium hydrogenocarbonate (1/1) is added to adjust the pH to ±4. A first addition of Bruggolite®FF6 M solution is added in one shot. After 5 minutes, the remainder of Bruggolite®FF6 M and the tBHP are added via two separate lines during 60 minutes.

Finally, the reactor is cooled down to room temperature and a biocide is added. The product is finally filtered over a 130μ filter. The final latex has a solid content of ~60%.

TABLE 1

Intake for Ex 2

| Product: Example 2 | Intake (g) |
|---|---|
| Initial reactor content | |
| Demineralised Water | 380.25 |
| Potassium persulfate | 1.05 |
| Na2CO3 | 1.98 |
| Monomer pre-emulsion 1 (1 h addition) | |
| Demineralised Water | 79.81 |
| DisponilA3065 (65%) | 7.77 |
| Rhodacal DS10 | 1.51 |
| VeoVa-10 | 200 |
| AA | 3.09 |
| MAA | 10.1 |
| nDDCM | 2.02 |
| Initiator solution (3 h 30 addition) | |
| Demi Water | 115.82 |
| Potassium persulfate | 4.76 |
| Monomer pre-emulsion 2 (2 h addition) | |
| Demineralised Water | 270.26 |
| REASOAP | 30.86 |
| Rhodacal DS10 | 16.24 |
| BA | 639.79 |
| EA | 50.04 |
| MA | 50.46 |
| AA | 7.13 |
| MAA | 20.8 |
| MMA | 10.22 |
| BA Shot (30') | 25.36 |
| Post cooking 60' Iron shot | |
| Iron II - Fe(SO4) | 0.02 |
| water | 5.12 |
| Conversion booster Shot | |
| Demineralised water | 12.49 |
| Bruggolite FF6 | 0.78 |

TABLE 1-continued

Intake for Ex 2

| Product: Example 2 | Intake (g) |
|---|---|
| Addition in parallel with Shot | |
| Demineralised water | 33.42 |
| Bruggolite FF6 | 2.86 |
| Demineralised water | 33.71 |
| tBHP (70%) | 4.07 |

TABLE 2

Residual Monomer Levels

| | Compar. 1 | Compar. 2 | Example 1 | Example 2 | Example 3 |
|---|---|---|---|---|---|
| PE-1 + (h) | 2.5 (VV/A) | 1 (VV) | 1 (VV) | 1 (VV) | 1.5 (VV) |
| Init + (h) | 3 | 3.5 (A) | 3.5 (A) | 3.5 (A) | 4.5 |
| Cooking | 0.5 (+KPS) | — | — | — | 0.5 |
| PE-2 + (h) | — | 2 | 2 | 2 | 2.5 |
| Shot (h) | 0.5 | 0.5 | 0.5 | 0.5 | — |
| Cooking (h) | 1 | 1 | 1 | 1 | 0.5 |
| Booster (h) | 1.5 | 1.5 | 1.5 | 1.5 | 1.0 |
| No shot | x | | | | x |
| Shot Vinyl Acetate | | x | | | |
| Shot Methyl Acrylate | | | x | | |
| Shot Butyl Acrylate | | | | x | |
| Residual VV 10 (ppm) | 2100 | 380 | 360 | 200 | 224 |
| Residual BA (ppm) | | 40 | 60 | 120 | 22 |
| Residual VAM (ppm) | | 340 | | | |
| Sum Residuals | 2100 | 760 | 420 | 320 | 246 |

From the table 2 above, it appears that the new sequential process where all of the VeoVa is placed in the first pre-emulsion 1 and kept separated from the acrylic monomers has a profound effect on the total monomer conversion. Shots of various monomers were tested at the end of the addition of the second pre-emulsion. It is clearly demonstrate that the monomer conversion is higher, as the total residual level of below 500 ppm is reached. However a similar effect on the residual monomer can be reach by changing the sequence and the reaction time period (as for example 3).

PSA Properties

Upon applications and drying, the lattices prepared with the new core/shell approach, are defect free and show good clarity.

PSA films were prepared by direct coating on 23 micron Polyester Facestock at 20 gsm coat-weight.

The basic PSA properties were evaluated and various substrates (Stainless Steel and High Density Polyethylene) after different dwell times.

The results given in Table 3 below shows slightly lower adhesion level, slightly higher loop tack and equal shear resistance. Overall it can be stated that the new process used to obtain residual monomer levels below 500 ppm does not affect significantly the PSA properties of the polymers.

TABLE 3

|  | | Comp 1 | EX 1 | EX 3 |
|---|---|---|---|---|
| PL SS 20' | N/inch | 7.2 | 5.7 | 5.6 |
| PL SS 24 h | N/inch | 9.7 | 8.6 | 7.4 |
| PL PE 24 h | N/inch | 5.4 | 3.3 | 5.4 |
| LT SS | N/inch | 3.1 | 4.9 | 5.6 |
| Shear (0.5 inch$^2$ × 1 kg) | min | >10000 | >10000 | >10000 |

The dry films based on the composition of the present invention provide enhanced water whitening resistance. Moreover these polymer compositions could also formulated with nonpolar tackifiers and other additives without compatibility issues.

The invention claimed is:

1. A process for reducing the amount of residual vinyl ester monomer in a vinyl ester-acrylate co-polymeric emulsion by using sequential polymerization steps consisting essentially of:
   a) adding a pre-emulsion consisting essentially of monomers of vinyl ester of alkyl of C1 to C18 carboxylic acids to water containing a radical initiator;
   b) adding to a) a pre-emulsion consisting essentially of monomers of alkyl acrylate, an emulsion consisting essentially of monomers of alkyl methacrylate, or a combination thereof to form a polymeric emulsion; and
   c) adding to the polymeric emulsion one or more monomers of liquid acrylates, methacrylates, or combinations thereof, wherein each of the one or more liquid acrylates or methacrylates monomers comprise an alkyl chain of C1 to C16, and forming the vinyl ester-acrylate co-polymeric emulsion, wherein the vinyl ester-acrylate co-polymer is a co-polymer of vinyl ester monomers and acrylate monomers, methacrylate monomers, or combinations thereof.

2. The process of claim 1, wherein the vinyl ester of alkyl of C1 to C18 carboxylic acids consists of a linear alkyl chain, from 3 carbon atoms as a branched alkyl chain, from 5 carbon atoms as a branched tertiary alkyl chain, or a mixture thereof.

3. The process of claim 2, wherein the vinyl ester of alkyl of C1 to C18 carboxylic acids is vinyl propionate, vinyl n-butyrate, vinyl laurate, vinyl ester of 2-ethyl hexanoic acid, vinyl caprate, and vinyl stearate, vinyl neodecanoates, vinyl pivalate or a mixture thereof.

4. The process of claim 1, wherein the monomers of alkyl acrylate or alkyl methacrylate are reaction products of ethylenically unsaturated carboxylic acids and C1 to C20 alcohols.

5. The process of claim 4, wherein the monomers of alkyl acrylate or alkyl methacrylate are selected from the group consisting of methyl (meth)acrylate, ethyl (meth)acrylate, propyl (meth)acrylate, n-butyl (meth)acrylate, isobutyl (meth)acrylate, t-butyl (meth)acrylate, pentyl (meth)acrylate, hexyl (meth)acrylate, cyclohexyl (meth)acrylate, benzyl (meth)acrylate, 2-ethylhexyl (meth)acrylate, heptyl (meth)acrylate, n-octyl (meth)acrylate, iso-octyl (meth)acrylate, nonyl (meth)acrylate, decyl (meth)acrylate, 2-propyl heptyl (meth)acrylate, undecyl (meth)acrylate, dodecyl (meth)acrylate, tridecyl (meth)acrylate, stearyl (meth)acrylate, isobornyl (meth)acrylate, norbornyl (meth)acrylate, 4-tertbutylcyclohexyl (meth)acrylate, 3,3,5-trimethylcyclohexyl (meth)acrylate or a mixture thereof.

6. The process of claim 1, wherein the monomers of alkyl acrylate or the alkyl methacrylate of c) is selected from methyl (meth)acrylate, ethyl (meth)acrylate, propyl (meth)acrylate, n-butyl (meth)acrylate, isobutyl (meth)acrylate, t-butyl (meth)acrylate, pentyl (meth)acrylate, hexyl (meth)acrylate, cyclohexyl (meth)acrylate, 2-ethylhexyl (meth)acrylate, heptyl (meth)acrylate, n-octyl (meth)acrylate, iso-octyl (meth)acrylate or a mixture thereof.

7. The process of claim 3, wherein the vinyl ester of alkyl of C1 to C18 carboxylic acids is a vinyl ester of neodecanoic acids.

* * * * *